(12) United States Patent
Wu et al.

(10) Patent No.: US 9,772,790 B2
(45) Date of Patent: Sep. 26, 2017

(54) CONTROLLER, FLASH MEMORY APPARATUS, METHOD FOR IDENTIFYING DATA BLOCK STABILITY, AND METHOD FOR STORING DATA IN FLASH MEMORY APPARATUS

(71) Applicant: Huawei Technologies Co., Ltd., Shenzhen (CN)

(72) Inventors: Liming Wu, Chengdu (CN); Bin Huang, Chengdu (CN); Wan Zhao, Chengdu (CN)

(73) Assignee: HUAWEI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 15/085,831

(22) Filed: Mar. 30, 2016

(65) Prior Publication Data

US 2016/0216915 A1    Jul. 28, 2016

Related U.S. Application Data

(63) Continuation of application No. PCT/CN2014/093139, filed on Dec. 5, 2014.

(51) Int. Cl.
*G06F 12/02* (2006.01)
*G06F 3/06* (2006.01)

(52) U.S. Cl.
CPC .......... *G06F 3/0641* (2013.01); *G06F 3/0608* (2013.01); *G06F 3/0616* (2013.01);
(Continued)

(58) Field of Classification Search
None
See application file for complete search history.

(56) References Cited

U.S. PATENT DOCUMENTS 9,390,116 B1* 7/2016 Li .................... G06F 17/30336
2009/0055618 A1 2/2009 Nakanishi et al.
(Continued)

FOREIGN PATENT DOCUMENTS

CN    102981969 A    3/2013
CN    103019887 A    4/2013
(Continued)

OTHER PUBLICATIONS

Feng Chen, Tian Luo, and Xiaodong Zhang. 2011. CAFTL: a content-aware flash translation layer enhancing the lifespan of flash memory based solid state drives. In Proceedings of the 9th USENIX conference on File and stroage technologies (FAST'11). USENIX Association, Berkeley, CA, USA, 6-6.*
(Continued)

*Primary Examiner* — Edward Dudek, Jr.
*Assistant Examiner* — Ralph A Verderamo, III
(74) *Attorney, Agent, or Firm* — Huawei Technologies Co., Ltd.

(57) ABSTRACT

In a method for controlling data stored in an Solid State Disk (SSD) of a data de-duplication system, a storage controller obtains stability information of a data block. The stability information comprises a reference count of the data block and a length of a period of time when the data block is stored in the SSD. The storage controller identifies a stability level of the data block according to the stability information, and sends the stability level of the data block to the SSD. The SSD moves the data block to a target block which corresponds to the stability level. Thereby, the SSD can store data blocks having a same stability level together.

12 Claims, 8 Drawing Sheets

(52) U.S. Cl.
CPC ............ *G06F 3/0679* (2013.01); *G06F 12/02* (2013.01); *G06F 12/0246* (2013.01); *G06F 2212/1036* (2013.01); *G06F 2212/7205* (2013.01)

(56) References Cited

U.S. PATENT DOCUMENTS

| | | | | |
|---|---|---|---|---|
| 2010/0077266 | A1* | 3/2010 | Kanno | G06F 11/1068 714/704 |
| 2011/0167221 | A1* | 7/2011 | Pangal | G06F 11/1453 711/117 |
| 2011/0191521 | A1* | 8/2011 | Araki | G06F 12/0246 711/103 |
| 2011/0225347 | A1* | 9/2011 | Goss | G06F 12/0246 711/103 |
| 2011/0238890 | A1* | 9/2011 | Sukegawa | G06F 12/0246 711/103 |
| 2011/0264843 | A1* | 10/2011 | Haines | G06F 12/0246 711/103 |
| 2012/0023144 | A1* | 1/2012 | Rub | G06F 12/0246 707/813 |
| 2012/0159098 | A1* | 6/2012 | Cheung | G06F 12/0261 711/162 |
| 2012/0226691 | A1 | 9/2012 | Edwards | |
| 2012/0297122 | A1* | 11/2012 | Gorobets | G06F 12/0246 711/103 |
| 2012/0317337 | A1* | 12/2012 | Johar | G06F 12/0246 711/103 |
| 2013/0024609 | A1* | 1/2013 | Gorobets | G06F 12/0246 711/103 |
| 2013/0297873 | A1 | 11/2013 | Hyde et al. | |
| 2014/0006694 | A1* | 1/2014 | Seo | G06F 12/0246 711/103 |
| 2014/0013032 | A1 | 1/2014 | Min et al. | |
| 2014/0208007 | A1* | 7/2014 | Cohen | G06F 3/0608 711/103 |
| 2014/0325172 | A1 | 10/2014 | Rubowitz | |
| 2015/0193170 | A1* | 7/2015 | Sundaram | G06F 3/0641 711/103 |

FOREIGN PATENT DOCUMENTS

| | | |
|---|---|---|
| CN | 103455435 A | 12/2013 |
| CN | 103455436 A | 12/2013 |
| CN | 103577336 A | 2/2014 |
| JP | 2012014400 | 1/2012 |
| JP | 2014513848 | 6/2014 |
| JP | 2014522537 | 9/2014 |
| KR | 20130140851 A | 12/2013 |
| WO | 2007013372 | 2/2007 |

OTHER PUBLICATIONS

Zhang, Yu-Fang et al., "Method about identifying hot data in solid state memory based on queue count," Application Research of Computers., vol. 28, No. 8, Aug. 2011. Total 11 pages.

* cited by examiner

CONTROLLER, FLASH MEMORY APPARATUS, METHOD FOR IDENTIFYING DATA BLOCK STABILITY, AND METHOD FOR STORING DATA IN FLASH MEMORY APPARATUS

CROSS-REFERENCE TO RELATED APPLICATIONS

This application is a continuation of International Application No. PCT/CN2014/093139, filed on 5 Dec. 2014, which is hereby incorporated by reference in its entirety.

TECHNICAL FIELD

Embodiments of the present invention relate to the field of storage technologies, and in particular, to a controller, a flash memory apparatus, a method for identifying data block stability, and a method for storing data in a flash memory apparatus.

BACKGROUND

A flash memory apparatus is a non-volatile memory whose storage medium is NAND flash, and has a characteristic that data does not disappear after power-off. Therefore, the flash memory apparatus is widely used as an external memory or an internal memory. A flash memory apparatus that uses the NAND flash as a storage medium may be a solid state disk (SSD for short), which is also called a solid state drive (full name: solid state drive, SSD for short), or may be another memory.

An SSD generally includes multiple flash memory chips, where each flash memory chip includes a plurality of blocks. The NAND flash has an erasability feature. Therefore, unlike data in a common mechanical hard disk, data stored in a block is not directly modified. When data needs to be modified, an idle block for storing modified data needs to be found. Then, the modified data is written into the idle block, and a logical address of the original data is mapped to the modified data. The original data stored in the original block becomes invalid. For an SSD, valid data refers to data that is stored in a block and is mapped to a logical address. The valid data will be read. Invalid data refers to data that is stored in a block and is not mapped to a logical address. The invalid data will not be read.

As data stored in an SSD increases, there are fewer available idle blocks. Therefore, it is necessary to perform garbage collection on the SSD to generate idle blocks. The garbage collection refers to that valid data in a block is moved into an idle block, and the original block is erased, so that the erased block can be written with data as an idle block. Generally, when the garbage collection is performed on the SSD, a block storing a great amount of invalid data may be found. Because the block storing a great amount of invalid data stores a small amount of valid data, data that needs to be moved into an idle block is small. As a lifetime of the SSD is related to a quantity of erasure times of an NAND flash, less data to be moved during garbage collection indicates smaller write amplification of the SSD. However, since the chances that data in different blocks is modified are almost equivalent, there is no obvious difference in amounts of invalid data included in the blocks.

SUMMARY

A first aspect of an embodiment of the present invention provides a controller, where the controller is located in a storage system with a data de-duplication function, the storage system includes a flash memory apparatus, and the flash memory apparatus stores a first data block; the controller includes a processor, a cache, and a communications interface; where: the communications interface is configured to communicate with the flash memory apparatus; the cache stores information about the first data block, where the information about the first data block includes a reference count of the first data block, or a length of a period of time when the first data block is stored in the flash memory apparatus, or a reference count of the first data block and a length of a period of time when the first data block is stored in the flash memory apparatus, where the reference count of the first data block is equal to a quantity of times that the controller receives the first data block; and the processor is configured to read the information about the first data block from the cache; determine a stability level of the first data block according to (1) the reference count of the first data block, and a mapping relationship between a reference count and a stability level that are of a data block; or (2) the length of the period of time when the first data block is stored in the flash memory apparatus (it's age), and a mapping relationship between a length of a period of time when a data block is stored in a flash memory apparatus and a stability level; or (3) the reference count of the first data block, the length of the period of time when the first data block is stored in the flash memory apparatus, and a mapping relationship among a reference count of a data block, a length of a period of time when the data block is stored in a flash memory apparatus, and a stability level, where the stability level is used to indicate stability of the data block; and send a logical address of the first data block and the stability level of the first data block to the flash memory apparatus through the communications interface.

In a first implementation manner of the first aspect, the mapping relationship between a reference count and a stability level that are of a data block includes: a mapping relationship between a reference count interval and a stability level; and the processor is specifically configured to determine a first reference count interval according to the reference count of the first data block, where the reference count of the first data block is within the first reference count interval; and determine the stability level of the first data block according to the first reference count interval and the mapping relationship between a reference count interval and a stability level.

In a second implementation manner of the first aspect, the mapping relationship between a length of a period of time when a data block is stored in a flash memory apparatus and a stability level includes: a mapping relationship between a time interval and a stability level; and the processor is specifically configured to determine a first time interval according to the length of the period of time when the first data block is stored in the flash memory apparatus (the age of the first data block), where the length of the period of time when the first data block is stored in the flash memory apparatus is within the first time interval; and determine the stability level of the first data block according to the first time interval and the mapping relationship between a time interval and a stability level.

In a third implementation manner of the first aspect, the mapping relationship among a reference count of a data block, a length of a period of time when the data block is stored in a flash memory apparatus, and a stability level includes: a mapping relationship among a reference count interval, a time interval, and a stability level; and the processor is specifically configured to determine a first reference count interval according to the reference count of the first data block, where the reference count of the first data block is within the first reference count interval; determine a first time interval according to the length of the period of time when the first data block is stored in the flash memory apparatus, where the length of the period of time when the first data block is stored in the flash memory apparatus is within the first time interval; and determine the stability level of the first data block according to the first time interval and the mapping relationship among a reference count interval, a time interval, and a stability level.

A second aspect of an embodiment of the present invention provides a flash memory apparatus, including a main controller and a flash memory chip, where the flash memory chip includes a block, and the main controller includes a processor, where the processor is configured to obtain a stability level corresponding to a target logical address, where the stability level is used to indicate stability of a data block; and move a data block of the target logical address into a block corresponding to the stability level.

In a first implementation manner of the second aspect, the processor is further configured to search the flash memory chip for a block storing a largest amount of invalid data, where the block storing the largest amount of invalid data includes the data block corresponding to the target logical address.

In a second implementation manner of the second aspect, the processor is further configured to search the flash memory chip for a block that remains unerased for a longest time, where the block that remains unerased for the longest time includes the data block corresponding to the target logical address.

In a third implementation manner of the second aspect, the main controller further includes a cache; and the processor is specifically configured to obtain the stability level corresponding to the target logical address when a quantity of logical addresses stored in the cache reaches a preset threshold, where a stability level corresponding to the logical addresses is the same as the stability level corresponding to the target logical address.

A third aspect of an embodiment of the present invention provides a method for a controller to identify stability of a data block, where the controller is located in a storage system with a data de-duplication function, the storage system includes a flash memory apparatus, and the flash memory apparatus stores a first data block; the controller includes a processor, a cache, and a communications interface; where the communications interface is configured to communicate with the flash memory apparatus; the cache stores information about the first data block, where the information about the first data block includes a reference count of the first data block, or a length of a period of time when the first data block is stored in the flash memory apparatus (the age of the first data block), where the reference count of the first data block is equal to a quantity of times that the controller receives the first data block; the method is executed by the processor, and the method includes: reading the information about the first data block from the cache; determining a stability level of the first data block according to (1) the reference count of the first data block, and a mapping relationship between a reference count and a stability level that are of a data block; or (2) the length of the period of time when the first data block is stored in the flash memory apparatus (the age of the first data block), and a mapping relationship between a length of a period of time when a data block is stored in a flash memory apparatus and a stability level; or (3) the reference count of the first data block, the length of the period of time when the first data block is stored in the flash memory apparatus, and a mapping relationship among a reference count of a data block, a length of a period of time when the data block is stored in a flash memory apparatus, and a stability level, where the stability level is used to indicate stability of the data block; and sending a logical address of the first data block and the stability level of the first data block to the flash memory apparatus through the communications interface.

In a first implementation manner of the third aspect, the mapping relationship between a reference count and a stability level that are of a data block includes: a mapping relationship between a reference count interval and a stability level; and the determining a stability level of the first data block according to (1) the reference count of the first data block, and a mapping relationship between a reference count and a stability level that are of a data block includes: determining a first reference count interval according to the reference count of the first data block, where the reference count of the first data block is within the first reference count interval; and determining the stability level of the first data block according to the first reference count interval and the mapping relationship between a reference count interval and a stability level.

In a second implementation manner of the third aspect, the mapping relationship between a length of a period of time when a data block is stored in a flash memory apparatus and a stability level includes: a mapping relationship between a time interval and a stability level; and the determining a stability level of the first data block according to (2) the length of the period of time when the first data block is stored in the flash memory apparatus, and a mapping relationship between a length of a period of time when a data block is stored in a flash memory apparatus and a stability level includes: determining a first time interval according to the length of the period of time when the first data block is stored in the flash memory apparatus, where the length of the period of time when the first data block is stored in the flash memory apparatus is within the first time interval; and determining the stability level of the first data block according to the first time interval and the mapping relationship between a time interval and a stability level.

In a third implementation manner of the third aspect, the mapping relationship among a reference count of a data block, a length of a period of time when the data block is stored in a flash memory apparatus, and a stability level includes: a mapping relationship among a reference count interval, a time interval, and a stability level; and the determining a stability level of the first data block according to (3) the reference count of the first data block, the length of the period of time when the first data block is stored in the flash memory apparatus, and a mapping relationship among a reference count of a data block, a length of a period of time when the data block is stored in a flash memory apparatus, and a stability level includes: determining a first reference count interval according to the reference count of the first data block, where the reference count of the first data block is within the first reference count interval; determining a first time interval according to the length of the period of time when the first data block is stored in the flash memory apparatus, where the length of the period of time when the first data block is stored in the flash memory apparatus is within the first time interval; and determining the stability level of the first data block according to the first reference count interval, the first time interval, and the mapping relationship among a reference count interval, a time interval, and a stability level.

A fourth aspect of an embodiment of the present invention provides a method for storing data in a flash memory apparatus, where the flash memory apparatus includes a main controller and a flash memory chip, the flash memory chip includes a block, and the main controller includes a processor; the method is executed by the processor, and the method includes: obtain a stability level corresponding to a target logical address, where the stability level is used to indicate stability of a data block; and moving a data block of the target logical address into a block corresponding to the stability level according to the stability level corresponding to the target logical address.

In a first implementation manner of the fourth aspect, the method further includes: searching the flash memory chip for a block storing a largest amount of invalid data, where the block storing the largest amount of invalid data includes the data block corresponding to the target logical address.

In a second implementation manner of the fourth aspect, the method further includes: searching the flash memory chip for a block that remains unerased for a longest time, where the block that remains unerased for the longest time includes the data block corresponding to the target logical address.

In a third implementation manner of the fourth aspect, the main controller further includes a cache; and the obtaining a stability level corresponding to a target logical address includes: obtaining the stability level corresponding to the target logical address when a quantity of logical addresses stored in the cache reaches a preset threshold, where a stability level corresponding to the logical addresses is the same as the stability level corresponding to the target logical address.

A fifth aspect of an embodiment of the present invention provides an apparatus for identifying stability of a data block, where the apparatus is located in a controller, the controller is located in a storage system with a data de-duplication function, the storage system includes a flash memory apparatus, and the flash memory apparatus stores a first data block; and the apparatus includes: a storage module, configured to store information about the first data block, where the information about the first data block includes a reference count of the first data block, or a length of a period of time when the first data block is stored in the flash memory apparatus, or a reference count of the first data block and a length of a period of time when the first data block is stored in the flash memory apparatus, where the reference count of the first data block is equal to a quantity of times that the controller receives the first data block; a reading module, configured to read, from the storage module, the information about the first data block; a determining module, configured to determine a stability level of the first data block according to (1) the reference count of the first data block, and a mapping relationship between a reference count and a stability level that are of a data block; or (2) the length of the period of time when the first data block is stored in the flash memory apparatus (the age of the first data block), and a mapping relationship between a length of a period of time when a data block is stored in a flash memory apparatus and a stability level; or (3) the reference count of the first data block, the length of the period of time when the first data block is stored in the flash memory apparatus, and a mapping relationship among a reference count of a data block, a length of a period of time when the data block is stored in a flash memory apparatus, and a stability level; and a sending module, configured to send a logical address of the first data block and the stability level of the first data block to the flash memory apparatus.

In a first implementation manner of the fifth aspect, the mapping relationship between a reference count and a stability level that are of a data block includes: a mapping relationship between a reference count interval and a stability level; and the determining module is specifically configured to determine a first reference count interval according to the reference count of the first data block, where the reference count of the first data block is within the first reference count interval; and determine the stability level of the first data block according to the first reference count interval and the mapping relationship between a reference count interval and a stability level.

In a second implementation manner of the fifth aspect, the mapping relationship between a length of a period of time when a data block is stored in a flash memory apparatus and a stability level includes: a mapping relationship between a time interval and a stability level; and the determining module is specifically configured to determine a first time interval according to the length of the period of time when the first data block is stored in the flash memory apparatus, where the length of the period of time when the first data block is stored in the flash memory apparatus is within the first time interval; and determine the stability level of the first data block according to the first time interval and the mapping relationship between a time interval and a stability level.

In a third implementation manner of the fifth aspect, the mapping relationship among a reference count of a data block, a length of a period of time when the data block is stored in a flash memory apparatus, and a stability level includes: a mapping relationship among a reference count interval, a time interval, and a stability level; and the determining module is specifically configured to determine a first reference count interval according to the reference count of the first data block, where the reference count of the first data block is within the first reference count interval; determine a first time interval according to the length of the period of time when the first data block is stored in the flash memory apparatus, where the length of the period of time when the first data block is stored in the flash memory apparatus is within the first time interval; and determine the stability level of the first data block according to the first reference count interval, the first time interval, and the mapping relationship among a reference count interval, a time interval, and a stability level.

A sixth aspect of an embodiment of the present invention provides an apparatus for storing data in a flash memory apparatus, where the apparatus is located in a main controller of the flash memory apparatus, and the flash memory apparatus stores a block; and the apparatus includes: an obtaining module, configured to obtain a stability level corresponding to a target logical address, where the stability level is used to indicate stability of a data block; and a migrating module, configured to move a data block of the target logical address into a block corresponding to the stability level according to the stability level corresponding to the target logical address.

In a first implementation manner of the sixth aspect, the obtaining module is further configured to search a flash memory chip for a block storing a largest amount of invalid data, where the block storing the largest amount of invalid data includes the data block corresponding to the target logical address.

In a second implementation manner of the sixth aspect, the obtaining module is further configured to search a flash memory chip for a block that remains unerased for a longest time, where the block that remains unerased for the longest time includes the data block corresponding to the target logical address.

In a third implementation manner of the sixth aspect, the apparatus further includes a storage module, where the storage module stores a logical address, and a stability level corresponding to the logical address is the same as the stability level corresponding to the target logical address; and the obtaining module is specifically configured to obtain the stability level corresponding to the target logical address when a quantity of logical addresses stored in a cache reaches a preset threshold.

A seventh aspect of an embodiment of the present invention provides a computer program product, including a computer readable storage medium that stores program code, where an instruction included in the program code is used to execute the method according to any one of the third aspect to the third implementation manner of the third aspect.

An eight aspect of an embodiment of the present invention provides a computer program product, including a computer readable storage medium that stores program code, where an instruction included in the program code is used to execute the method according to any one of the fourth aspect to the third implementation manner of the fourth aspect.

The controller provided in embodiments of the present invention may determine a stability level of a first data block according to (1) a reference count of the first data block, and a mapping relationship between a reference count and a stability level that are of a data block; or (2) a length of a period of time when the first data block is stored in a flash memory apparatus, and a mapping relationship between a length of a period of time when a data block is stored in a flash memory apparatus and a stability level; or (3) a reference count of the first data block, a length of a period of time when the first data block is stored in the flash memory apparatus, and a mapping relationship among a reference count of a data block, a length of a period of time when the data block is stored in a flash memory apparatus, and a stability level, where the stability level may reflect stability of the data block; and send the stability level and a logical address that are of the data block to the flash memory apparatus 22, so that the flash memory apparatus 22 stores data blocks having a same stability level together.

The flash memory apparatus provided in the embodiments of the present invention may store data blocks having a same stability level in one block. For a block that stores a data block having a high stability level, a probability that the data block stored in the block becomes invalid is low. Generally, the block does not include invalid data or includes only a small amount of invalid data; such a block is a block having high utilization, and such a block is not collected when garbage collection is performed on the flash memory apparatus 22. For a block that stores a data block having a low stability level, a probability that the data block stored in the block becomes invalid is high. Assuming that most data or a vast majority of data in a block all becomes invalid, correspondingly, an amount of valid data included in this block is small, and an amount of data that needs to be moved when garbage collection is performed is small, which reduces write amplification. It should be noted that an effect of this embodiment is mainly reflected in that to-be-moved valid data in subsequent garbage collection is reduced. It can be seen that, both a block that stores a data block having a high stability level and a block that stores a data block having a low stability level can reduce write amplification of the flash memory apparatus 22, thereby prolonging a lifetime of the flash memory apparatus 22 to some extent.

BRIEF DESCRIPTION OF DRAWINGS

To describe the technical solutions in the embodiments of the present invention more clearly, the following briefly introduces the accompanying drawings required for describing the embodiments.

DESCRIPTION OF EMBODIMENTS

Embodiments of the present invention provide a controller, a flash memory apparatus, a method for identifying stability of a data block, and a method for storing data in a flash memory apparatus, which can store data having a same stability level together, so that an amount of valid data included in a block that is selected when the flash memory apparatus performs a subsequent garbage collection operation is as small as possible, thereby reducing write amplification of the flash memory apparatus.

Before the embodiments of the present invention are described, terms used in the following are described first.

A data object refers to an object including real data, which may be block data, a file, or data in another form.

A data block refers to a data unit formed by dividing a data object. For ease of management, one data object may be divided into a plurality of data blocks. The sizes of all the data blocks are the same.

Metadata of a data block refers to information used to describe the data block, such as a logical address of the data block, a physical address of the data block, a mapping relationship between the logical address and the physical address, and a write-in time of the data block.

Stable data refers to data having a low chance of being modified.

A logical block address, also called a logical address (full name: logical block address, LBA for short), refers to a storage address of a data block. The address is not a physical address at which the data block is stored in an SSD, but an address that can be accessed by the outside.

A physical block address, also called a physical address (full name: physical block address, PBA for short), refers to a real address at which a data block is stored in an SSD.

A reference count (or reference counting) of a data block is applied to a storage system with a data de-duplication function, and is used to indicate the quantity of duplications of the data block in the storage system. For the storage system with a data de-duplication function, a same data block does not need to be stored for multiple times in the storage system. Therefore, the quantity of duplications of the data block in the storage system is equal to a quantity of times that a controller receives the data block, and actually, only one copy is stored. In addition, a reference count of a data block may also indicate a quantity of times that a physical address of the data block is referenced.

Valid data in an SSD refers to a data block stored in a block of the SSD is mapped to a logical address. That is, a physical address of the valid data has a corresponding logical address.

Invalid data in an SSD refers to a data block stored in a block of the SSD and is not mapped to a logical address, that is, the physical address of the invalid data has no corresponding logical address.

Figure 1:
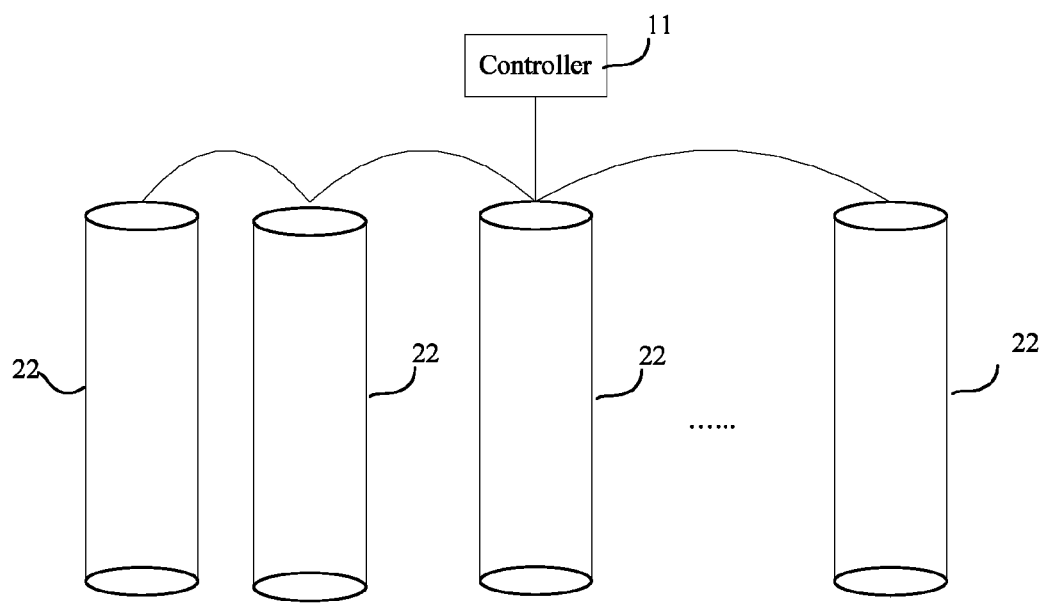
FIG. 1 is a schematic structural diagram of a storage system according to an embodiment of the present invention.

FIG. 1 is a schematic structural diagram of a storage system according to an embodiment of the present invention. The storage system shown in FIG. 1 at least includes a controller 11 and multiple flash memory apparatuses 22. A flash memory apparatus 22 is a storage apparatus that uses an NAND flash as a storage medium. The flash memory apparatus 22 may include a solid state disk (full name: solid state disk, SSD for short), which is also called a solid state drive (full name: solid state drive, SSD for short), or may include another memory. In this embodiment, an SSD is used as an example to describe the flash memory apparatus 22.

FIG. 1 is merely an exemplary description, and a specific networking manner is not limited. For example, both tree networking and ring networking can be used, provided that the controller 11 can communicate with the flash memory apparatuses 22.

The controller 11 may be any computer device known in the prior art, such as a server and a desktop computer. The controller 11 may receive a data object sent by a host (not shown in FIG. 1), and send a write data request to the flash memory apparatuses 22. The flash memory apparatuses 22 write the data object included in the write data request into flash memory chips of the flash memory apparatuses 22.

Figure 2:
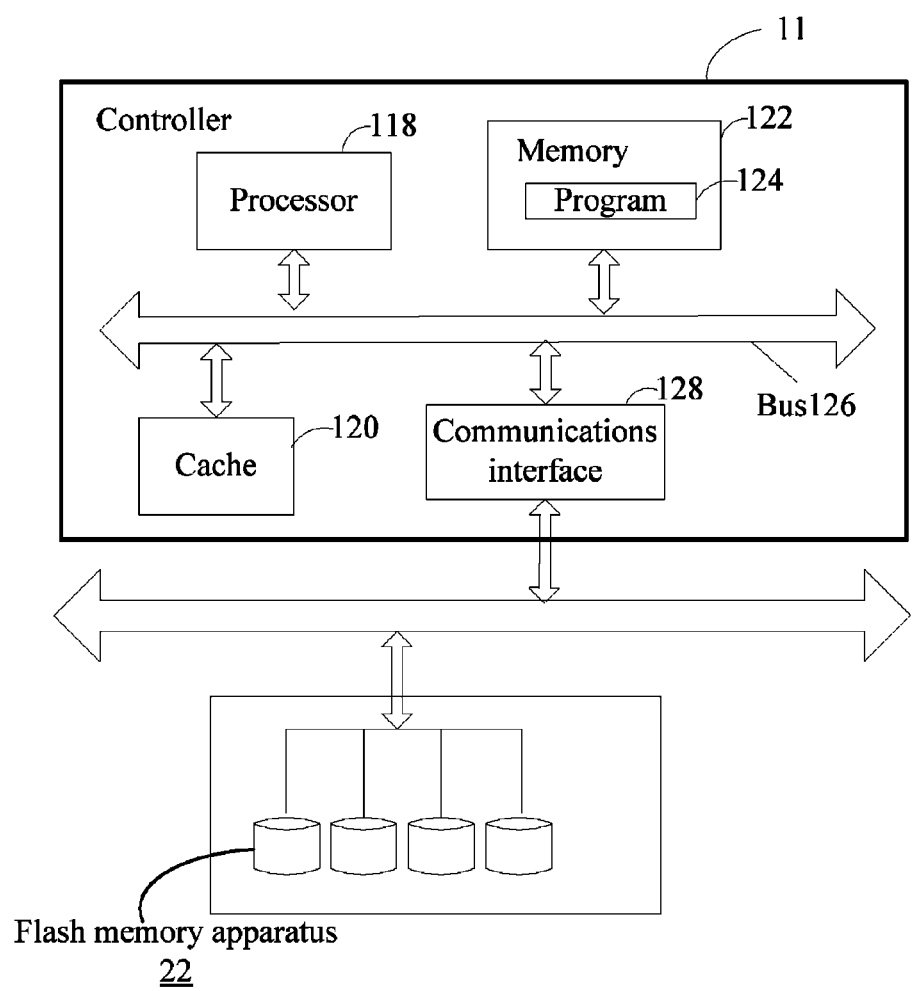
FIG. 2 is a schematic structural diagram of a controller according to an embodiment of the present invention.

FIG. 2 is a schematic structural diagram of a controller 11 according to an embodiment of the present invention. As shown in FIG. 2, the controller 11 mainly includes a processor 118, a cache 120, a memory 122, a communications bus (bus for short) 126, and a communications interface 128. The processor 118, the cache 120, the memory 122, and the communications interface 128 communicate with each other by using the communications bus 126.

The processor 118 may be a central processing unit CPU, or an application-specific integrated circuit ASIC (application-specific integrated circuit), or one or more integrated circuits configured to implement this embodiment of the present invention. In this embodiment of the present invention, the processor 118 is configured to receive a data object from a host, process the data object, and then send the processed data object to a flash memory apparatus 22.

The communications interface 128 is configured to communicate with the host or the flash memory apparatus 22.

The memory 122 is configured to store a program 124. The memory 122 may be, for example, a high-speed RAM memory, or a non-volatile memory, or a magnetic disk storage. It can be understood that the memory 122 may be any non-transitory machine readable medium that can store program code, such as a random-access memory (RAM for short), a magnetic disk, a hard disk, an optical disc, a solid state disk (SSD for short), or a non-volatile memory.

The cache 120 is configured to temporarily store the data object received from the host or a data object read from the flash memory apparatus 22. In addition, because a data read/write speed of the cache is high, for ease of reading, some frequently-used information, such as information about a logical address and write-in time that are of a data block, may also be stored in the cache. The cache 120 may be any non-transitory machine readable medium that can store data, such as a RAM, a storage-class memory (SCM for short), a non-volatile memory (NVM for short), a flash memory, or a solid state disk (SSD for short), which is not limited herein.

The cache 120 and the memory 122 may be integrated or separately disposed, which is not limited by this embodiment of the present invention.

The program 124 may include program code, where the program code includes a computer operation instruction. For a storage system with a data de-duplication function, the program code may include a data de-duplication module and a stability determining module. The data de-duplication module is configured to de-duplicate data before the data object received from the host is sent to the flash memory apparatus 22.

The data de-duplication function is briefly described in the following:

After the controller 11 receives the data object sent by the host, the data object may be divided into a plurality of data blocks of a same size. For ease of description, that a size of each data block is 4 KB is used as an example for description. It can be understood that the size of the data block is not limited to 4 KB. For each data block, the processor 118 separately determines whether there is another data block identical to the data block that is stored in each flash memory apparatus 22. If another data block identical to the data block is not stored in each flash memory apparatus 22, the processor 118 writes the data block into the flash memory apparatus 22 and sets a reference count of the data block to an initial value (for example, a value equal to 1). If another data block identical to the data block is already stored in a flash memory apparatus 22, the processor 118 increases the reference count of the data block by 1. The stored data block does not need to be written into the flash memory apparatus 22 again. Therefore, a reference count reflects stability of a data block to some extent. A data block with a larger reference count has a higher probability of being used in a long time, because the larger reference count indicates a smaller probability of being deleted. Accordingly, the data block has a higher stability level.

A general practice for determining whether there is another identical data block stored in each flash memory apparatus 22 is: pre-storing fingerprint information of each data block stored in the flash memory apparatus 22, where the fingerprint information of each data block is obtained by performing computation on each data block according to a preset hash function; then, performing computation on a to-be-stored data block according to the hash function, to obtain fingerprint information of the to-be-stored data block; and matching the fingerprint information with the fingerprint information of the pre-stored fingerprint information of each data block. If there is same fingerprint information, the flash memory apparatus 22 has stored an identical data block. If there is no same fingerprint information, the to-be-stored data block has not been stored. The fingerprint information of each data block may be stored in the cache 120, or may be stored in the flash memory apparatus 22. In addition, other manners not enumerated herein may be used to determine whether there is an identical data block stored in each flash memory apparatus 22, which is.

In addition, for a data block that is written into the flash memory apparatus 22 for the first time, the controller 11 may store a mapping relationship between fingerprint information of the data block and an LBA of the data block. When the controller 11 needs to send the LBA of the data block to the flash memory apparatus 22, the LBA may be found according to the fingerprint information of the data block and the mapping relationship. Specifically, the LBA of the data block may be sent to the controller 11 after the flash memory apparatus 22 stores the data block, or may be an LBA allocated by the controller 11 to the data block. Because the flash memory apparatus 22 stores a mapping relationship between an LBA and a PBA, the flash memory apparatus 22 may write the data block into storage space corresponding to the PBA according to the allocated LBA.

However, the reference count may be one reference factor that determines the stability of the data block, and the other reference factor that can affect the stability of the data block is a length of a period of time when the data block is stored in the flash memory apparatus 22. The length of the period of time when the data block is stored in the flash memory apparatus 22 may be equal to a difference obtained by a current system time point minus a time point of writing the data block into the flash memory apparatus. The time point of writing the data block into the flash memory apparatus may be stored as a part of metadata of the data block in the cache 120 or the flash memory apparatus 22. It can be understood that if the length of the period of time when the data block is stored in the flash memory apparatus 22 is larger, the data block is more stable; if the length of the period of time when the data block is stored in the flash memory apparatus 22 is smaller, the data block is more unstable. It can be understood that the time length may also be a value that reflects a length of a period of time when the data block is stored in the flash memory apparatus 22, and is not strictly equal to the difference obtained by the current system time minus the time point when the data block is written into the flash memory apparatus.

A main function of the stability determining module is determining the stability of the data block based on the reference count, or based on the length of the period of time when the data block is stored in the flash memory apparatus 22, or based on the reference count and the length of the period of time when the data block is stored in the flash memory apparatus 22. Therefore, a stability level of the data block is obtained. The stability level is a value that reflects the stability of the data block. A larger value indicates higher stability, and a smaller value indicates lower stability. Alternatively, the stability level may also be defined as follows: a smaller value indicates higher stability, and a larger value indicates lower stability.

After obtaining the stability level of the data block by the stability determining module, the controller 11 may send the LBA and the stability level that are of the data block to the flash memory apparatus 22, so that the flash memory apparatus 22 stores data blocks having a same level together in one or more blocks.

The following describes a structure and a function of the flash memory apparatus 22.

Figure 3A:
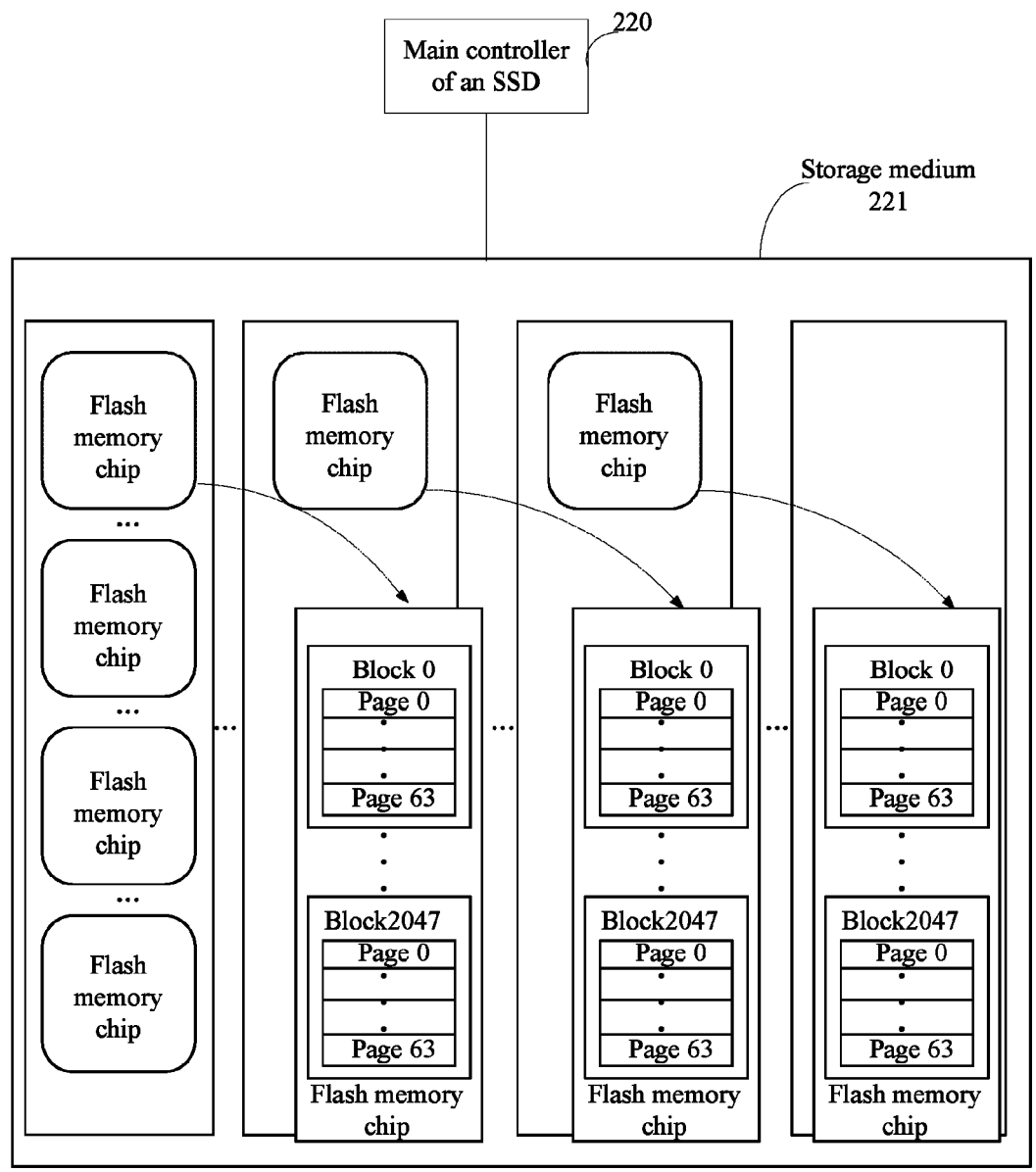
FIG. 3A is a schematic structural diagram of a storage medium of a flash memory apparatus according to an embodiment of the present invention.

FIG. 3A is a schematic structural diagram of a flash memory apparatus 22 according to an embodiment of the present invention. In this embodiment, an SSD is used as an example to describe the flash memory apparatus 22.

As shown in FIG. 3A, the flash memory apparatus 22 includes a main controller 220 and a storage medium 221. The main controller 220 is configured to receive an I/O request or another piece of information sent by a controller 11 to the flash memory apparatus 22. For example, the information may be a logical address and a stability level that are of a data block, and the main controller 220 is further configured to execute the received I/O request, for example, write a data block included in the I/O request into a storage medium 221, or read a data block from a storage medium 221 and return the data block to the controller 11. The main controller 220 herein is a main controller of the SSD.

The storage medium 221 generally includes a plurality of flash chips. Each flash memory chip includes a plurality of blocks. Each block includes a plurality of pages (page). The main controller 220 writes, in the unit of pages, a data block into a block.

An NAND flash has an erasability feature. Therefore, unlike data in a common mechanical hard disk, data stored in a block is not directly modified. When data of a block needs to be modified, an idle block needs to be found, and modified data is written into the idle block. Then, the data in the original block becomes invalid. As data stored in the SSD increases, there are fewer available idle blocks. Therefore, it is necessary to perform garbage collection on the SSD to generate an available idle block. In this embodiment, when the garbage collection is performed, blocks storing a largest amount of invalid data are generally selected in sequence for collection. A triggering condition of the garbage collection is that a quantity of idle blocks included in the flash memory chip is less than a first threshold. The first threshold may be an integer greater than 10 and less than 100.

In addition, an inspection needs to be periodically performed in the flash memory apparatus 22. The inspection refers to an operation of periodically moving data stored in the flash memory chip to prevent data loss due to that block remaining unerased for a long time. For the NAND flash, a capability of maintaining data can be retained only for a period of time; therefore, data stored in the NAND flash needs to be periodically moved to another block. In this embodiment, when the inspection is performed, generally blocks that remain unerased for the longest time are selected in sequence, valid data in the block is moved into an idle block, and then the original block is erased, where a triggering condition of the inspection may be that a current inspection period begins.

A lifetime of an SSD is related to a quantity of erasure times of an NAND flash. Therefore, reducing times of data moving inside the SSD as far as possible is beneficial for reducing write amplification, thereby prolonging the lifetime of the SSD. In this embodiment, moving of the data inside the SSD mainly refers to moving of valid data in a block when garbage collection or an inspection is performed. It can be understood that, for a block on which garbage collection is to be performed, less valid data included in the block indicates less data to be moved. Therefore, the present invention mainly stores data blocks with a same stability level together in the SSD according to a stability level of each data block, so that valid data that is to be moved during a subsequent garbage collection operation is as little as possible.

Figure 3B:
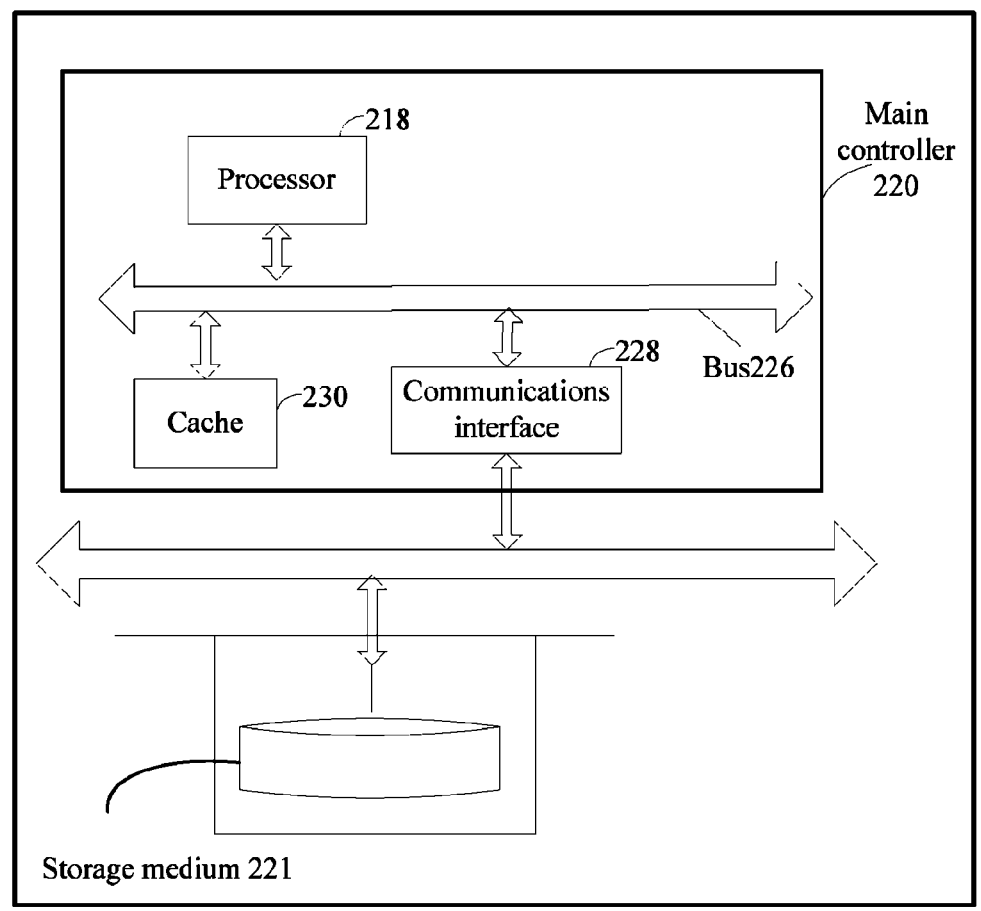
FIG. 3B is a schematic structural diagram of a main controller of a flash memory apparatus according to an embodiment of the present invention.

FIG. 3B is a schematic structural diagram of a main controller 220 of a flash memory apparatus 22 described in an embodiment of the present invention.

The main controller 220 mainly includes a processor 218, a cache 230, a communications bus (bus for short) 226, and a communications interface 228. The processor 218, the cache 230, and the communications interface 228 communicate with each other by using the communications bus 226.

The processor 218 may be a central processing unit CPU, or an application-specific integrated circuit ASIC (application-specific integrated circuit), or one or more integrated circuits configured to implement this embodiment of the present invention. In this embodiment of the present invention, the processor 218 may be configured to receive, from a controller 11, an I/O request, or information such as a logical address of a data block and a stability level of the data block. In addition, the processor 218 is further configured to execute the I/O request.

The communications interface 228 is configured to communicate with the controller 11 and a storage medium 221.

The cache 230 is configured to temporarily store the information received from the controller 11, such as the logical address of the data block and the stability level of the data block. The cache 230 may be any non-transitory or transitory (transitory) machine readable medium that can store data, such as a RAM, an SCM, and an NVM, which is not limited herein. In addition, in some application scenarios, the cache 230 may also be disposed out of the main controller 220.

In this embodiment, a mapping table may be stored in the cache 230 and is used to store a mapping relationship between an LBA of a data block and a stability level of the data block that are received from the controller 11. Generally, the cache 230 further stores a mapping table that records a mapping relationship between an LBA and a PBA. In this embodiment of the present invention, a mapping relationship between an LBA and a stability level may be added based on the mapping table.

Alternatively, multiple arrays are stored in the cache 230, where each array is corresponding to a stability level, and the array may store logical addresses of multiple data blocks corresponding to the stability level.

Alternatively, the cache 230 may not store a mapping table. Instead, logical addresses of data blocks with a same stability level are stored together in a piece of cache space in the cache 230. For example, the controller 11 may send cache area division information to the flash memory apparatus 22 in advance, where the cache area division information includes different stability levels (for example, 10 stability levels from 1 to 10). After receiving the cache area division information, the flash memory apparatus 22 divides the cache 230 into 10 cache areas according to the 10 stability levels, where each cache area is corresponding to a stability level and is specially used to store a logical address of a data block corresponding to the stability level. Alternatively, the controller 11 may not send cache area division information to the flash memory apparatus 22 in advance, but directly sends a logical address of a data block and a stability level of the data block to the flash memory apparatus 22. The flash memory apparatus 22 marks out a segment of cache area from the cache 230 according to the stability level of the data block, and maps the cache area to the stability level (which means storing a mapping relationship between the cache area and the stability level). Then the cache area can be specially used to store the logical address of the data block corresponding to the stability level. Both of the foregoing two manners may be used to store the logical addresses of the data blocks having the same stability level together in a piece of cache space of the cache 230.

Figure 4:
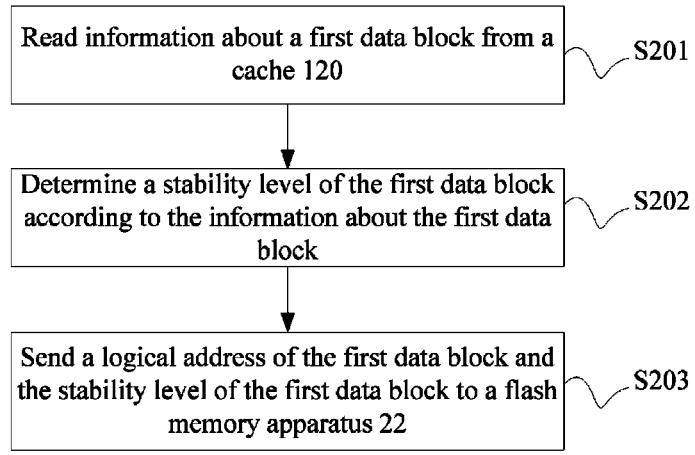
FIG. 4 is a schematic flowchart of a method for identifying stability of a data block according to an embodiment of the present invention.

The following describes a method for identifying stability of a data block according to an embodiment of the present invention, where the method describes, from a perspective of a controller 11, a process of obtaining a stability level of a data block according to a reference count of the data block, a time length, or a reference count and a time length, and sending the stability level to a flash memory apparatus 22. Referring to FIG. 4, FIG. 4 is a schematic flowchart of the method for identifying stability of a data block, where the method may be applied to the storage system shown in FIG. 1 and the controller 11 shown in FIG. 2, and is executed by the processor 118 in the controller 11. The method includes:

Step S201: Read information about a first data block from a cache 120, where the information about the first data block includes a reference count of the first data block, or a length of a period of time when the first data block is stored in a flash memory apparatus, or a reference count of the first data block and a length of a period of time when the first data block is stored in a flash memory apparatus, where the reference count of the first data block is equal to a quantity of times that the controller receives the first data block.

It should be noted that in this embodiment, the first data block is one of multiple data blocks stored in the flash memory apparatus 22, and the first data block is used herein as an example for description. In addition, the first data block in this embodiment refers to a data block including valid data. A reference count of a data block including invalid data is 0. The controller 11 deletes information about the data block whose reference count is 0 from the cache 120.

In addition, a triggering condition of step S201 may be set to that: sizes of all data blocks received by the controller 11 exceed a preset volume threshold, or a preset time interval arrives, or one of the foregoing two triggering conditions is met. The preset volume threshold may be equal to an available volume presented by the storage system shown in FIG. 1 to a user, or an integral multiple of an available volume.

Step S202: Determine a stability level of the first data block according to the information about the first data block.

The controller 11 may preset a quantity of stability levels.

Optionally, an implementation manner is: because each data block stored in the flash memory apparatus 22 has a reference count, these reference counts may be divided into multiple reference count intervals, where each reference count interval is corresponding to a stability level. For example, assuming that 10 stability levels are preset, a mapping relationship between a reference count interval and a stability level may be shown in Table 1.

TABLE 1

| Reference count | Stability level |
| --- | --- |
| +∞ > Reference count ≥ 35 | 1 |
| 35 > Reference count ≥ 30 | 2 |
| 30 > Reference count ≥ 25 | 3 |
| 25 > Reference count ≥ 20 | 4 |
| 20 > Reference count ≥ 15 | 5 |
| 20 > Reference count ≥ 15 | 6 |
| 15 > Reference count ≥ 10 | 7 |
| 10 > Reference count ≥ 5 | 8 |
| 5 > Reference count ≥ 2 | 9 |
| Reference count = 1 | 10 |

Then, correspondingly, the determining a stability level of the first data block according to the information about the first data block may be specifically: determining a first reference count interval according to the reference count of the first data block, where the reference count of the first data block is within the first reference count interval; and determining the stability level of the first data block according to the first reference count interval and the mapping relationship shown in Table 1. For example, if the reference count of the first data block is 3, the stability level corresponding to the first data block is 9.

Optionally, another implementation manner is: dividing a length of a period of time when multiple data blocks are stored in a flash memory apparatus into multiple time intervals, where each time interval is corresponding to a stability level. For example, assuming that 10 stability levels are preset, a mapping relationship between a time interval and a stability level may be shown in Table 2.

TABLE 2

| Length of a period of time when a data block is stored in a flash memory apparatus (Unit: day) | Stability level |
| --- | --- |
| +∞ > Time length ≥ 35 | 1 |
| 35 > Time length ≥ 30 | 2 |
| 30 > Time length ≥ 25 | 3 |
| 25 > Time length ≥ 20 | 4 |
| 20 > Time length ≥ 15 | 5 |
| 20 > Time length ≥ 15 | 6 |
| 15 > Time length ≥ 10 | 7 |
| 10 > Time length ≥ 5 | 8 |
| 5 > Time length ≥ 2 | 9 |
| Time length = 1 | 10 |

Then, correspondingly, the determining a stability level of the first data block according to the information about the first data block may be specifically: determining a first time interval according to the length of the period of time when the first data block is stored in the flash memory apparatus, where the length of the period of time when the first data block is stored in the flash memory apparatus is within the first time interval; and determining the stability level of the first data block according to the first time interval and the mapping relationship shown in Table 2. For example, if the length of the period of time when the first data block is stored in the flash memory is 12, the stability level corresponding to the first data block is 7.

Optionally, still another implementation manner is: dividing multiple time lengths into at least two time intervals, and dividing multiple reference counts into at least two reference count intervals, where there is a mapping relationship among a time interval, a reference count interval, and a stability level.

For example, whether a time length is greater than a threshold T may be used as a determining standard to divide the time length into at least two time intervals, where one time interval is (0, T), and the other time interval is [T, +∞). A stability level of a data block whose time length is within [T, +∞) is higher than a stability level of a data block whose time length is within (0, T). In each time interval, a reference count is further divided into multiple reference count intervals, and stability levels of data blocks having a same reference count interval are the same. For data blocks belonging to different reference count intervals, a stability level of a data block whose reference count is larger is greater than a stability level of a data block whose reference count is smaller. Assuming that 10 stability levels are preset, a mapping relationship among a time interval, a reference count interval, and a stability level may be shown in Table 3.

TABLE 3

| Length of a period of time when a data block is stored in a flash memory apparatus | Reference count | Stability level |
| --- | --- | --- |
| ≥T | +∞ > Reference count ≥ 20 | 1 |
| ≥T | 20 > Reference count ≥ 10 | 2 |
| ≥T | 10 > Reference count ≥ 5 | 3 |
| ≥T | 5 > Reference count ≥ 2 | 4 |
| ≥T | Reference count = 1 | 5 |
| <T | +∞ > Reference count ≥ 20 | 6 |
| <T | 20 > Reference count ≥ 10 | 7 |
| <T | 10 > Reference count ≥ 5 | 8 |
| <T | 5 > Reference count ≥ 2 | 9 |
| <T | Reference count = 1 | 10 |

Alternatively, multiple reference counts may be grouped into two reference count intervals, where one reference count interval is (0, 10), and the other reference count interval is [10, +∞). A stability level of a data block whose reference count is within [10, +∞) is higher than a stability level of a data block whose reference count is within (0, 10). In each reference count interval, multiple time lengths are further divided into multiple time intervals, and stability levels of data blocks within a same time interval are the same. For data blocks within different time intervals, a stability level of a data block whose time length is larger is higher than a stability level of a data block whose time length is smaller. Assuming that 10 stability levels are preset, a mapping relationship among a time interval, a reference count interval, and a stability level may be shown in Table 4.

TABLE 4

| Reference count | Length of a period of time when a data block is stored in a flash memory apparatus (Unit: day) | Stability level |
| --- | --- | --- |
| ≥10 | +∞ > Time length ≥ 20 | 1 |
| ≥10 | 20 > Time length ≥ 10 | 2 |
| ≥10 | 10 > Time length ≥ 5 | 3 |
| ≥10 | 5 > Time length ≥ 2 | 4 |
| ≥10 | Time length = 1 | 5 |
| <10 | +∞ > Time length ≥ 20 | 6 |
| <10 | 20 > Time length ≥ 10 | 7 |
| <10 | 10 > Time length ≥ 5 | 8 |
| <10 | 5 > Time length ≥ 2 | 9 |
| <10 | Time length = 1 | 10 |

Correspondingly, the determining a stability level of the first data block according to the information about the first data block may be specifically: determining a first reference count interval according to the reference count of the first data block, where the reference count of the first data block is within the first reference count interval; determining a first time interval according to the length of the period of time when the first data block is stored in the flash memory apparatus, where the length of the period of time when the first data block is stored in the flash memory apparatus is within the first time interval; and determining the stability level of the first data block according to the first time interval and the mapping relationship among a reference count interval, a time length, and a stability level. It can be understood that, no matter whether the mapping relationship shown in Table 3 or the mapping relationship shown in Table 4 is used, as long as the length of the period of time when the first data block is stored in the flash memory apparatus and the reference count are determined, the stability level of the first data block can also be determined.

Optionally, in the foregoing two implementation manners, after the controller 11 processes each data block stored in the cache 120, a current task is completed, and a fixed value may be subtracted from a length of a period of time when each data block is stored in a flash memory apparatus, so that when a next task is started, the time length may be progressively increased from a small cardinal number.

Step S203: Send a logical address of the first data block and the stability level of the first data block to the flash memory apparatus 22.

Specifically, the controller 11 may independently send the logical address and the stability level that are of the first data block to the flash memory apparatus 22, or may send the logical address and the stability level that are of the first data block to the flash memory apparatus 22 together with a logical address and a stability level that are of another data block. For example, the logical address and the stability level may be included in a user-defined command, and the command is then sent to the flash memory apparatus 22.

In this embodiment, a controller 11 may determine a stability level of a first data block according to (1) a reference count of the first data block, and a mapping relationship between a reference count and a stability level that are of a data block; or (2) a length of a period of time when the first data block is stored in a flash memory apparatus, and a mapping relationship between a length of a period of time when a data block is stored in a flash memory apparatus and a stability level; or (3) a reference count of the first data block, a length of a period of time when the first data block is stored in a flash memory apparatus, and a mapping relationship among a reference count of a data block, a length of a period of time when the data block is stored in a flash memory apparatus, and a stability level, where the stability level may reflect stability of the data block; and send the stability level and a logical address that are of the data block to the flash memory apparatus 22, so that the flash memory apparatus 22 stores data blocks having a same stability level together.

Figure 5:
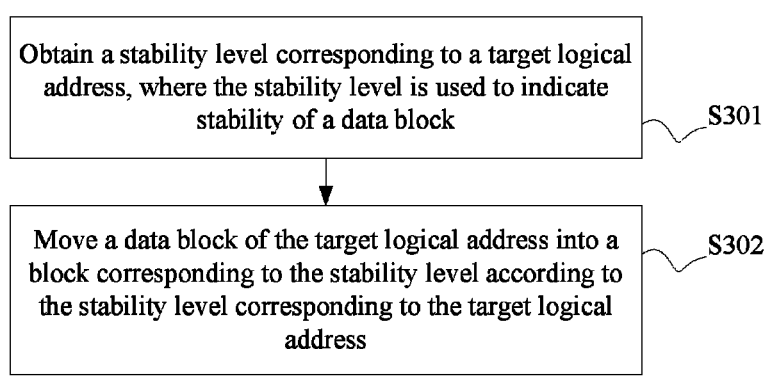
FIG. 5 is a schematic flowchart of a method for storing data in a flash memory apparatus according to an embodiment of the present invention.

The following describes a method for storing data in a flash memory apparatus according to an embodiment of the present invention, where the method describes, from a perspective of a flash memory apparatus 22, a process of storing data blocks having a same stability level together. Referring to FIG. 5, FIG. 5 is a schematic flowchart of the method for storing data in a flash memory apparatus, where the method may be applied to the storage system shown in FIG. 1 and the flash memory apparatus 22 shown in FIG. 3A and FIG. 3B, and is executed by the processor 218 in the flash memory apparatus 22. The method includes:

Step S301: Obtain a stability level corresponding to a target logical address, where the stability level is used to indicate stability of a data block.

Specifically, before step S301, the flash memory apparatus 22 receives multiple logical addresses sent by a controller 11 and stability levels corresponding to the logical addresses, and may store the multiple logical addresses and the stability levels corresponding to the logical addresses in a cache 230. The target logical address is one of the multiple logical addresses stored in the cache 230. When a task of data moving is triggered, the stability level corresponding to the target logical address may be obtained from the cache 230.

Step S302: Move a data block of the target logical address into a block corresponding to the stability level according to the stability level corresponding to the target logical address.

In this embodiment, a mapping relationship between a block in a flash memory chip and a stability level may be established, to move data blocks having a same stability level into a same block. According to this mapping relationship, the data block corresponding to the target logical address may be read from an original block and written into a block corresponding to the stability level corresponding to the target data block. The mapping relationship between a block in the flash memory chip and a stability level may be pre-established, or may be a mapping relationship that is recorded between the stability level and the block after one data block or multiple data blocks having a same stability level are written into a block for the first time.

That the data block corresponding to the target logical address is read from the original block may be specifically: generally, the cache 230 or the flash memory chip of the flash memory apparatus 22 stores a mapping table, where the mapping table is used to store a mapping relationship between a logical address and a physical address that are of each data block, so that according to the logical addresses received in step S301 and the mapping table, the data block may be read from storage space in which a corresponding physical address is located.

Data blocks having a same stability level may be stored in one block in the manner provided in this embodiment. For a block that stores a data block having a high stability level, a probability that the data block stored in the block becomes invalid is low. Generally, the block does not include invalid data or includes only a small amount of invalid data. Therefore, the block has high utilization and is not collected when garbage collection is performed on the flash memory apparatus 22. For a block that stores a data block having a low stability level, a probability that the data block stored in the block becomes invalid is high. In case most data or a vast majority of data in a block becomes invalid, an amount of valid data that needs to be moved when garbage collection is performed included in this block is small. This will reduce write amplification. It should be noted that an effect of this embodiment is mainly reflected in that to-be-moved valid data in subsequent garbage collection is reduced. It can be seen that, both a block that stores a data block having a high stability level and a block that stores a data block having a low stability level can reduce write amplification of the flash memory apparatus 22, thereby prolonging a lifetime of the flash memory apparatus 22 to some extent.

In addition, an exemplary implementation manner is: the foregoing step S301 and step S302 are combined with a garbage collection operation. When the flash memory apparatus 22 needs to perform garbage collection, the garbage collection is performed in the manner described in step S301 and step S302. Specifically, when a quantity of idle blocks included in the flash memory chip is less than a first threshold, blocks storing a largest amount of invalid data are found in sequence from the flash memory chip. Then, a logical address of a to-be-moved data block is obtained from these blocks. Further, a stability level corresponding to the logical address is obtained by searching the mapping relationship between the logical address and the stability level (with reference to the implementation manner in FIG. 5, the logical address is the target logical address). Then, the to-be-moved data block corresponding to the logical address is written into a corresponding block.

Another exemplary implementation manner is: the foregoing step S301 and step S302 are combined with an inspection operation. When the flash memory apparatus 22 needs to perform an inspection, the inspection is performed in the manner described in step S301 and step S302. Specifically, when a preset inspection period begins, blocks that remain unerased for a longest time are found in sequence from the flash memory chip. Then, a logical address of a to-be-moved data block is obtained from these blocks. Further, a stability level corresponding to the logical address is obtained by searching the mapping relationship between the logical address and the stability level (with reference to the implementation manner in FIG. 5, the logical address is the target logical address). Then, the to-be-moved data block corresponding to the logical address is written into a corresponding block.

A person skilled in the art may understand that no matter whether garbage collection or an inspection is performed, only valid data needs to be moved, while invalid data does not need to be moved because the invalid data cannot be read again. Further, all invalid data can be erased in block units after the valid data is moved completely. In this embodiment, since the logical addresses that are sent by the controller 11 and received by the flash memory apparatus 22 are all logical addresses of data blocks that include valid data (refer to the descriptions in step S201 in the embodiment shown in FIG. 4), the data blocks corresponding to the logical addresses that are sent by the controller 11 and received by the flash memory apparatus 22 all need to be moved.

According to the two exemplary implementation manners provided above, data blocks having a same stability level may be stored together when a flash memory apparatus 22 performs garbage collection or an inspection. As a flash memory apparatus generally needs to perform data moving when performing garbage collection or an inspection, there is no extra data moving operation in this embodiment, which can further reduce write amplification.

Figure 6A:
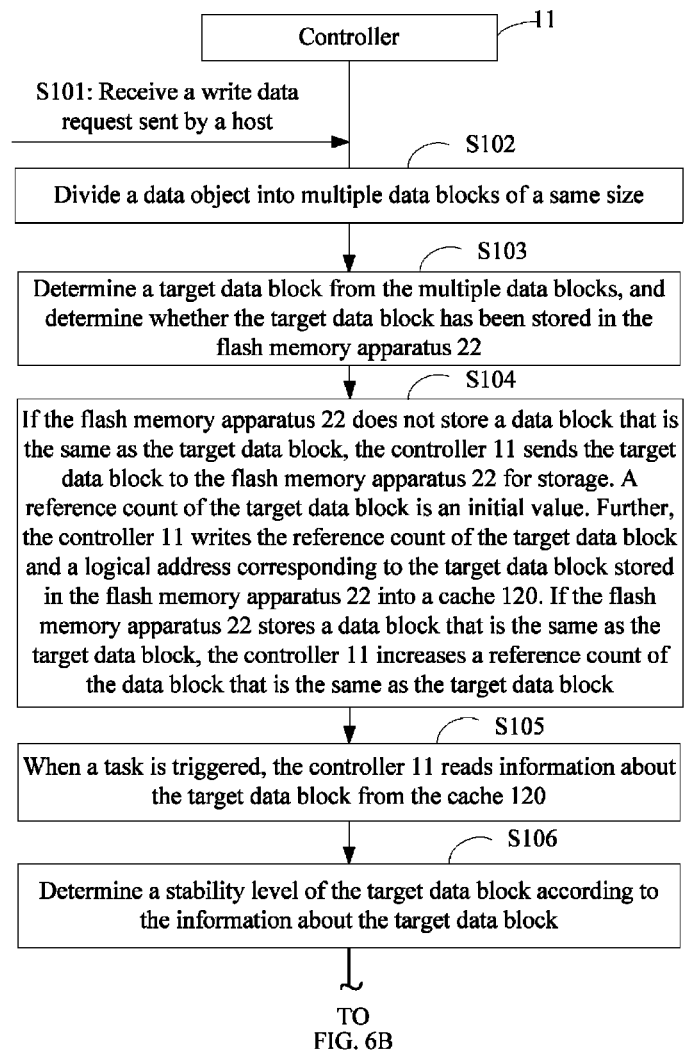
FIG. 6A and FIG. 6B are a schematic flowchart of another method for storing data in a flash memory apparatus according to an embodiment of the present invention.
Figure 6B:
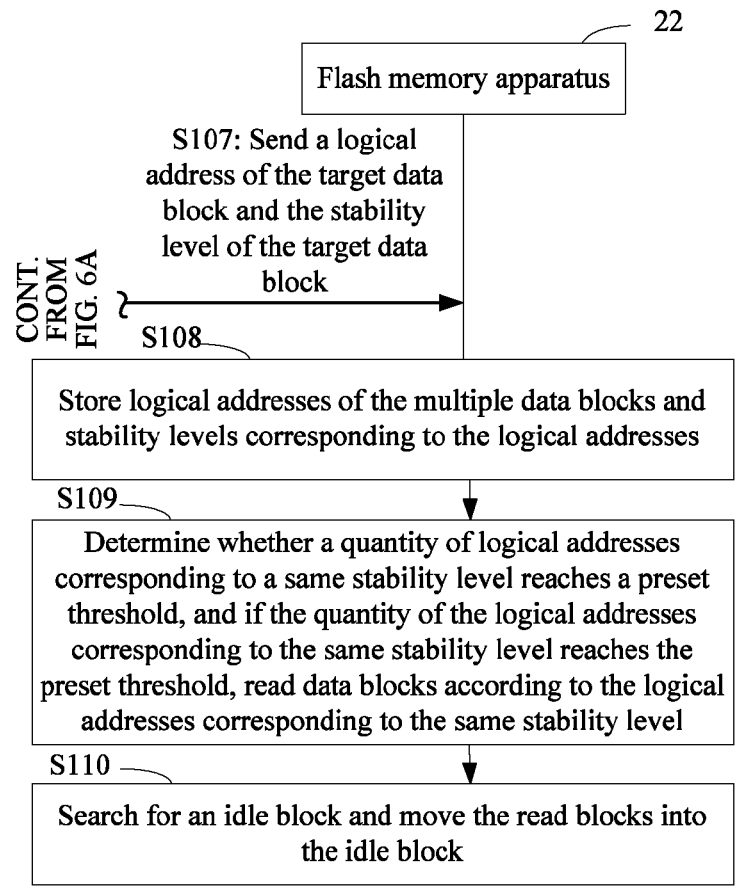

The following describes another method for storing data in a flash memory apparatus according to an embodiment of the present invention. Referring to FIG. 6A and FIG. 6B, FIG. 6A and FIG. 6B are a schematic flowchart of the method for storing data in a flash memory apparatus, where the method may be applied to the storage system shown in FIG. 1.

In this embodiment, step S101 to step S104 describe a process during which a controller 11 stores a received data block in a flash memory apparatus 22. Step S101 to step S104 may be applied to the controller 11 shown in FIG. 2 and are executed by the processor 118 in the controller 11.

In step S101, the controller 11 receives a write data request sent by a host, where the write data request includes a data object and address information of the data object, the address information may include an ID of a logical unit number (full name: logical unit number, LUN for short), and a start address and an offset that are of the LUN; or an ID of a file, and a start address and an offset that are of the file, or the like; or when the storage system includes multiple file systems, the address information may include an ID of a file system, an ID of a file, a start address and an offset that are of the file, and the like.

The data object is block data or a file to be written into the flash memory apparatus 22.

In step S102, the controller 11 divides the data object into multiple data blocks of a same size.

In step S103, the controller 11 determines a target data block from the multiple data blocks, and determines whether the target data block has been stored in the flash memory apparatus 22.

Specifically, before sending the multiple data blocks to the flash memory apparatus 22 for storage, the controller 11 needs to sequentially determine whether each data block has been stored in the flash memory apparatus, and if each data block has been stored in the flash memory apparatus, there is no need to store the data block again. For the determining manner thereof, refer to the foregoing descriptions of the function of the data de-duplication module, and details are not described herein again.

In step S104, if the flash memory apparatus 22 does not store a data block that is the same as the target data block, the controller 11 sends the target data block to the flash memory apparatus 22 for storage. A reference count of the target data block is an initial value. Further, the controller 11 writes the reference count of the target data block and a logical address corresponding to the target data block stored in the flash memory apparatus 22 into a cache 120. If the flash memory apparatus 22 stores a data block that is the same as the target data block, a reference count of the data block that is the same as the target data block is increased.

Specifically, the logical address corresponding to the target data block that is written into the flash memory apparatus 22 may be a logical address allocated by the controller 11 to the target data block. After allocating the logical address, the controller 11 sends the logical address to the flash memory apparatus 22. The flash memory apparatus 22 obtains a physical address corresponding to the logical address, according to a mapping relationship between a logical address and a physical address and writes the target data block into storage space corresponding to the physical address. In another way, the logical address may not be allocated by the controller 11 in advance, but a logical address fed back to the controller 11 by the flash memory apparatus 22 after storing the data block.

In the manner described in step S101 to step S104, the controller 11 may divide the received data object into a plurality of data blocks and store the data blocks in the flash memory apparatus 22. It can be understood that because the controller 11 has a data de-duplication function. Therefore, data blocks stored in the flash memory apparatus 22 are different. Information about these multiple different data blocks may be stored in the cache 120.

Step S105 to step S107 describe a process during which the controller 11 identifies a stability level of each data block stored in the flash memory apparatus 22 and sends the stability level to the flash memory apparatus 22. Step S105 to step S107 may be applied to the controller 11 shown in FIG. 2 and are executed by the processor 118 in the controller 11. It should be noted that there is no sequence between the process of identifying the stability level and the process of storing the received data block in the flash memory apparatus 22 in step S101 to step S104.

In step S105, when a task is triggered, the controller 11 reads information about the target data block from the cache 120.

The task herein refers to a task that the controller 11 identifies the stability level of each data block in the flash memory apparatus 22.

Specifically, the controller 11 may scan the information about the multiple data blocks and sequentially read information about each data block. For ease of description, a processing manner of a target data block is still used as an example for description in the following steps. It can be understood that a processing manner of another data block is similar to that of the target data block.

Information about the target data block includes a reference count of the target data block, or a length of a period of time when the target data block is stored in the flash memory apparatus, or a reference count of the target data block and a length of a period of time when the target data block is stored in the flash memory apparatus.

In step S106, the controller 11 determines a stability level of the target data block according to the information about the target data block.

Step S106 is similar to step S202 in the embodiment shown in FIG. 5. For details, refer to the descriptions in step S202.

In step S107, the controller 11 sends the logical address of the target data block and the stability level of the target data block to the flash memory apparatus 22.

In the manner described in step S105 to step S107, the controller 11 may send logical addresses and stability levels that are of the multiple data blocks to the flash memory apparatus 22.

Step S108 to step S110 describe a process during which the flash memory apparatus 22 stores data blocks having a same stability level together after receiving the stability levels of the data blocks sent by the controller 11. Step S108 to step S110 may be applied to the flash memory apparatus (such as an SSD) shown in FIG. 3A and FIG. 3B and are executed by the processor 218 in the flash memory apparatus 22.

In step S108, the flash memory apparatus 22 stores the logical addresses of the multiple data blocks and the stability levels corresponding to the logical addresses.

Optionally, a storage manner is that a mapping table is created in a cache 230 in the flash memory apparatus 22 and is used to store a mapping relationship between a logical address of a data block and a stability level of the data block that are received from the controller 11.

Optionally, another storage manner is that multiple arrays are stored in a cache 230, where each array is corresponding to a stability level. The logical addresses of the multiple data blocks are stored in arrays corresponding to the data blocks.

Optionally, still another storage manner is that a cache 230 is divided into a plurality of cache areas in advance, where each cache area is corresponding to a stability level. The logical addresses of the multiple data blocks are stored in cache areas corresponding to the data blocks.

In step S109, the flash memory apparatus 22 determines whether a quantity of logical addresses corresponding to a same stability level reaches a preset threshold, and if the quantity of the logical addresses corresponding to the same stability level reaches the preset threshold, reads data blocks according to the logical addresses corresponding to the same stability level.

The logical addresses corresponding to the same stability level may include the logical address of the target data block in step S105 to step S107.

It should be noted that the implementation manner shown in FIG. 6A and FIG. 6B may not be combined with a garbage collection operation or an inspection operation, that is, in this implementation manner, a triggering condition of data moving is different from that of the implementation manner shown in FIG. 5, and the triggering condition of this implementation manner is that the quantity of the logical addresses that are corresponding to the same stability level and are stored in the cache reaches the preset threshold.

There may be the following three implementation manners for determining whether the quantity of the logical addresses corresponding to the same stability level reaches the preset threshold:

A first implementation manner is: determining, according to the mapping table stored in the cache 230, whether the quantity of the logical addresses having the same stability level reaches the preset threshold.

A second implementation manner is: determining whether a quantity of logical addresses stored in one array in the cache 230 reaches the preset threshold.

A third implementation manner is: determining whether a quantity of logical addresses stored in one cache area of the cache 230 reaches the preset threshold.

The preset threshold may be set to a ratio of a volume of a block to a size of a data block. According to this implementation manner, when the quantity of the logical addresses reaches the threshold, the data blocks corresponding to the multiple logical addresses exactly fill up an idle block.

In step S110, the flash memory apparatus 22 searches for an idle block and moves the read data block into the idle block.

By analog, the data blocks having the same stability level may be sequentially stored in one or multiple idle blocks in the manner described in step S109 and step S110.

In addition, the preset threshold may also be set to a value greater than 2 but less than a ratio of a volume of a block to a size of a data block. In this case, in step S110, a block that is not filled may be found, to store the data blocks having the same stability level in the block that is not filled.

In the embodiment shown in FIG. 6A and FIG. 6B, a flash memory apparatus 22 stores data blocks having a same stability level together into one or multiple idle blocks, so that to-be-moved valid data in a subsequent garbage collection operation is reduced, thereby reducing write amplification and prolonging a lifetime of the flash memory apparatus 22 to some extent.

Figure 7:
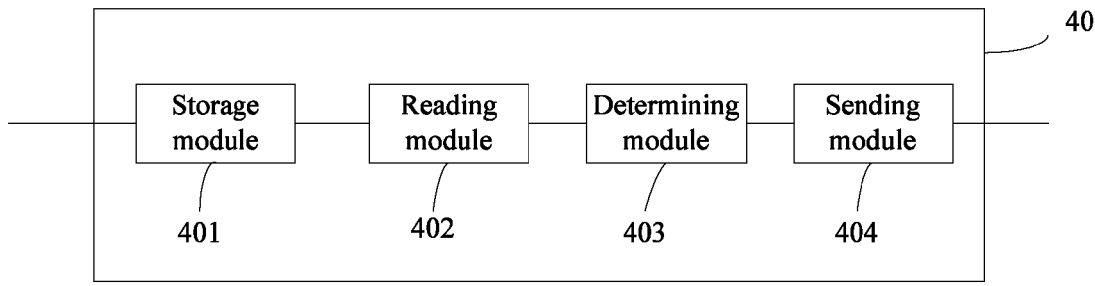
FIG. 7 is a schematic structural diagram of an apparatus for identifying stability of a data block according to an embodiment of the present invention.
Figure 8:
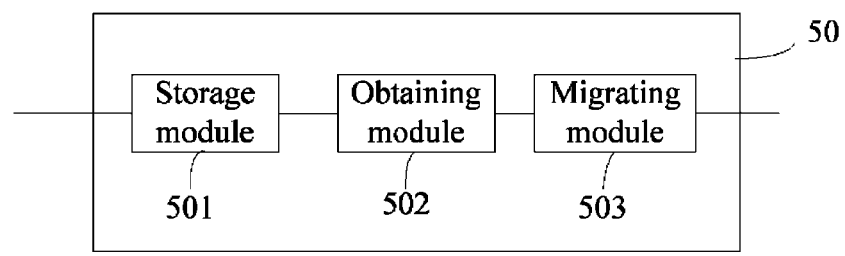
FIG. 8 is a schematic structural diagram of an apparatus for storing data in a flash memory apparatus according to an embodiment of the present invention.

An embodiment of the present invention further provides an apparatus 40 for identifying a stability level of a data block, where the apparatus 40 is located in a controller 11, the controller is located in the storage system shown in FIG. 1, the storage system includes a flash memory apparatus 22, and the flash memory apparatus 22 stores a first data block. As shown in FIG. 7, the apparatus 40 includes:

a storage module 401, configured to store information about the first data block, where the information about the first data block includes a reference count of the first data block, or a length of a period of time when the first data block is stored in the flash memory apparatus, or a reference count of the first data block and a length of a period of time when the first data block is stored in the flash memory apparatus, where the reference count of the first data block is equal to a quantity of times that the controller receives the first data block;

a reading module 402, configured to read, from the storage module, the information about the first data block;

a determining module 403, configured to determine a stability level of the first data block according to (1) the reference count of the first data block, and a mapping relationship between a reference count and a stability level that are of a data block; or (2) the length of the period of time when the first data block is stored in the flash memory apparatus, and a mapping relationship between a length of a period of time when a data block is stored in a flash memory apparatus and a stability level; or (3) the reference count of the first data block, the length of the period of time when the first data block is stored in the flash memory apparatus, and a mapping relationship among a reference count of a data block, a length of a period of time when the data block is stored in a flash memory apparatus, and a stability level; and a sending module 404, configured to send a logical address of the first data block and the stability level of the first data block to the flash memory apparatus 22.

In this embodiment, an apparatus 40 for identifying a stability level of a data block may determine a stability level of a first data block according to (1) a reference count of the first data block, and a mapping relationship between a reference count and a stability level that are of a data block; or (2) a length of a period of time when the first data block is stored in a flash memory apparatus, and a mapping relationship between a length of a period of time when a data block is stored in a flash memory apparatus and a stability level; or (3) a reference count of the first data block, a length of a period of time when the first data block is stored in the flash memory apparatus, and a mapping relationship among a reference count of a data block, a length of a period of time when the data block is stored in a flash memory apparatus, and a stability level, where the stability level may reflect stability of the data block; and send the stability level and a logical address that are of the data block to the flash memory apparatus 22, so that the flash memory apparatus 22 stores data blocks having a same stability level together.

Optionally, in the implementation manner shown in FIG. 7, the mapping relationship between a reference count and a stability level that are of a data block includes: a mapping relationship between a reference count interval and a stability level.

Then, the determining module 403 is specifically configured to determine a first reference count interval according to the reference count of the first data block, where the reference count of the first data block is within the first reference count interval; and determine the stability level of the first data block according to the first reference count interval and the mapping relationship between a reference count interval and a stability level.

Optionally, in the implementation manner shown in FIG. 7, the mapping relationship between the length of a period of time when a data block is stored in a flash memory apparatus and a stability level includes: a mapping relationship between a time interval and a stability level.

Then, the determining module 403 is specifically configured to determine a first time interval according to the length of the period of time when the first data block is stored in the flash memory apparatus, where the length of the period of time when the first data block is stored in the flash memory apparatus is within the first time interval; and determine the stability level of the first data block according to the first time interval and the mapping relationship between a time interval and a stability level.

Optionally, in the implementation manner shown in FIG. 7, the mapping relationship among a reference count of a data block, the length of a period of time when the data block is stored in a flash memory apparatus, and a stability level includes: a mapping relationship among a reference count interval, a time interval, and a stability level.

Then, the determining module 403 is specifically configured to determine a first reference count interval according to the reference count of the first data block, where the reference count of the first data block is within the first reference count interval; determine a first time interval according to the length of the period of time when the first data block is stored in the flash memory apparatus, where the length of the period of time when the first data block is stored in the flash memory apparatus is within the first time interval; and determine the stability level of the first data block according to the first reference count interval, the first time interval, and the mapping relationship among a reference count interval, a time interval, and a stability level.

In addition, for a specific implementation manner of each module of the apparatus 40, refer to the method embodiment shown in FIG. 5 or FIG. 7, and details are not described herein again.

An embodiment of the present invention further provides an apparatus 50 for storing data in a flash memory apparatus, where the apparatus 50 is located in a main controller of the flash memory apparatus 22, the flash memory apparatus 22 stores a block, and the apparatus 50 includes:

an obtaining module 501, configured to obtain a stability level corresponding to a target logical address, where the stability level is used to indicate stability of a data block; and a migrating module 502, configured to move a data block of the target logical address into a block corresponding to the stability level according to the stability level corresponding to the target logical address.

The apparatus 50 provided in this embodiment may be used to store data blocks having a same stability level in one block.

Optionally, the obtaining module 501 is further configured to search a flash memory chip for a block storing a largest amount of invalid data, where the block storing the largest amount of invalid data includes the data block corresponding to the target logical address.

Optionally, the obtaining module 501 is further configured to search a flash memory chip for a block that remains unerased for a longest time, where the block that remains unerased for the longest time includes the data block corresponding to the target logical address.

Optionally, the apparatus 50 further includes a storage module 503, where the storage module 503 stores a logical address, where a stability level corresponding to the logical address is the same as the stability level corresponding to the target logical address.

The obtaining module 501 is specifically configured to obtain the stability level corresponding to the target logical address when a quantity of logical addresses stored in a cache reaches a preset threshold.

The preset threshold is equal to a quotient of a volume of the block divided by a size of the data block.

In addition, for a specific implementation manner of each module of the apparatus 50, refer to the method embodiment shown in FIG. 6A and FIG. 6B or FIG. 7, and details are not described herein again.

An embodiment of the present invention further provides a computer program product for data processing, which includes a computer readable storage medium that stores program code, where an instruction included in the program code is used to execute the method procedure in any foregoing method embodiment.

A person of ordinary skill in the art may understand that the foregoing storage medium includes various types of non-transitory (non-transitory) machine readable media that can store program code, such as a USB flash drive, a removable hard disk, a magnetic disk, an optical disc, a random-access memory (RAM, random-access memory), a solid state disk (solid state disk, SSD), or a non-volatile memory (non-volatile memory).

Finally, it should be noted that all the foregoing embodiments are merely intended for describing the technical solutions of the present invention other than limiting the present invention.

We claim:

1. A method for controlling data stored in a first Solid State Drive (SSD) in a storage system having a data de-duplication function, wherein the first SSD is one of multiple SSDs being managed by a storage controller, and the storage controller is external to the multiple SSDs, the method comprising:

obtaining, by the storage controller, stability information of a data segment stored in the first SSD at a certain logical address, wherein the stability information comprises a reference count of the data segment and an age of the data segment, wherein the age of the data segment corresponds to a length of a period of time the data segment has been stored in the first SSD, and wherein the reference count of the data segment is equal to a number of times that the storage controller receives the data segment;

identifying, by the storage controller, a stability level of the data segment based on both the reference count and the age of the data segment, wherein the stability level is positively related to the age and the reference count of the data segment;

sending to the first SSD, by the storage controller, the logical address of the data segment and the stability level of the data segment, wherein the data segment is assigned to a block of the first SSD with data segments having similar stability levels; and moving, by the first SSD, the data segment stored at the logical address to the assigned block.

2. The method according to claim 1, wherein the stability level corresponds to a range of values of the reference count and a single value of the age.

3. The method of claim 1, wherein the stability level corresponds to a range of values of the age and a single value of the reference count.

4. The method of claim 1, wherein the stability level corresponds to a range of values of the age and a range of values of the reference count.

5. The method according to claim 1, further comprising:
receiving, by the storage controller, a new data segment;
obtaining, by the storage controller, a fingerprint of the new data segment by performing a hash operation of the new data segment;
sending, by the storage controller, the fingerprint to the first SSD;
comparing, by the first SSD, the fingerprint of the new data segment to previously stored fingerprints of previously stored data segments;
sending, by the first SSD, a response to the storage controller indicating that no match was found for the fingerprint of the new data segment; and
sending, by the storage controller, the new data segment to the first SSD for storage.

6. The method according to claim 5, wherein the reference count of the new data segment is set to an initial value, and the method further comprising:
storing, by the storage controller, the initial value as the reference count of the new data segment.

7. A storage controller in a storage system having a data de-duplication function, wherein the storage controller manages multiple solid state drives (SSDs), and the storage controller is external to the multiple SSDs, the storage controller comprising:

a memory, configured to store stability information of a data segment, wherein the data segment is stored in a first solid state drive (SSD) of the storage system at a certain logical address, wherein the stability information comprises a reference count of the data segment and an age of the data segment, wherein the age of the data segment corresponds to a length of a period of time the data segment has been stored in the first SSD, wherein the reference count of the data segment is the number of times that the storage controller receives the data segment, and wherein the first SSD is one of the multiple SSDs managed by the storage controller; and a processor, configured to:
identify a stability level of the data segment based on both the reference count of the data segment and the age of the data segment, wherein the stability level is positively related to the age and the reference count of the data segment; and
send the logical address of the data segment and the stability level of the data segment to the first SSD, so that the first SSD moves the data segment stored at the logical address to a block of the first SSD with data segments having similar stability levels.

8. The storage controller of claim 7, wherein the stability level corresponds to a range of values of the reference count and a single value of the age.

9. The storage controller of claim 7, wherein the stability level corresponds to a range of values of the age and a single value of the reference count.

10. The storage controller of claim 7, wherein the stability level corresponds to a range of values of the age and a range of values of the reference count.

11. The storage controller according to claim 7, wherein the processor is further configured to:
receive a new data segment;
obtain a fingerprint of the new data segment by performing a hash operation of the new data segment, wherein the first SSD stores a fingerprint corresponding to each data segment stored;
send the fingerprint of the new data segment to the first SSD;
receive a response from the first SSD indicating that no fingerprint stored in the first SSD matches the fingerprint of the new data segment; and
send the new data segment to the first SSD for storage.

12. The storage controller according to claim 11, wherein the reference count of the new data segment is set to an initial value, and
wherein the processor is further configured to store the initial value as the reference count of the new data segment.

\* \* \* \* \*